United States Patent [19]

Kitano

[11] Patent Number: 5,629,819
[45] Date of Patent: May 13, 1997

[54] FLOPPY DISK ASSEMBLY HAVING STORAGE-CAPACITY DISCRIMINATION MEANS

[75] Inventor: Takamasa Kitano, Tokyo, Japan

[73] Assignee: NEC Corporation, Tokyo, Japan

[21] Appl. No.: 373,021

[22] Filed: Jan. 17, 1995

Related U.S. Application Data

[63] Continuation of Ser. No. 96,986, Jul. 27, 1993, abandoned.

[30] Foreign Application Priority Data

Jul. 27, 1992 [JP] Japan ..................... 4-199355

[51] Int. Cl.$^6$ ..................................... G11B 17/04
[52] U.S. Cl. ........................ 360/99.02; 360/99.06; 369/77.2
[58] Field of Search .............. 360/99.02, 99.03, 360/99.06, 99.07, 133, 137, 99.01, 97.01; 369/75.2, 77.1, 77.2

[56] References Cited

U.S. PATENT DOCUMENTS

| | | | |
|---|---|---|---|
| 4,654,734 | 3/1987 | Shimaoka et al. | 360/99.02 |
| 4,995,029 | 2/1991 | Kobayashi et al. | 360/133 |
| 5,091,815 | 2/1992 | Suzuki | 360/133 |
| 5,091,901 | 2/1992 | Yamamoto et al. | 360/133 |
| 5,155,638 | 10/1992 | Aikawa et al. | 360/137 |
| 5,173,816 | 12/1992 | Ogihara | 360/133 |
| 5,243,480 | 9/1993 | Tangi et al. | 360/99.02 |

*Primary Examiner*—John H. Wolff
*Assistant Examiner*—William R. Korzuch
*Attorney, Agent, or Firm*—Sughrue, Mion, Zinn, Macpeak & Seas

[57] ABSTRACT

A floppy disk assembly is adapted to accommodate a floppy disk having a discrimination hole for discriminating a storage capacity and includes a detecting member, a cassette holding plate, a sliding plate, a lock member, and a rod member. The detecting member detects whether or not the discrimination hole is present. The sliding plate has a projection and is subjected to a spring action for causing the cassette holding plate to slide from a position at which the floppy disk is mounted/dismounted to a position at which writing/reading is performed by a magnetic head. The lock member engages or disengages with the projection on the sliding plate when the floppy disk is dismounted or mounted. A rod member is linked to one end of the lock member and is allowed to rotate as the floppy disk abuts the rod member upon the mounting of the floppy disk. The use of the rod member makes it possible to move the location of the lock member beyond the location of the hole detection member.

4 Claims, 4 Drawing Sheets

FLOPPY DISK ASSEMBLY HAVING STORAGE-CAPACITY DISCRIMINATION MEANS

This is a continuation of application Ser. No. 08/096,986 filed Jul. 27, 1993, now abandoned.

BACKGROUND OF THE INVENTION

(1) Field of the Invention

The present invention relates to a floppy disk assembly, and more particularly to a floppy disk mounting/dismounting mechanism in the floppy disk assembly equipped with a capacity discrimination means.

(2) Description of the Related Art

Conventionally, e floppy disk assembly did not have a means to detect a capacity discrimination hole (hereinafter referred to as "hole detection means") which is provided in the vicinity of a head window shutter of the floppy disk having the date storage capacity of, for example, over 10 MB. In such a conventional assembly which did not have the hole detection means, the floppy disk mounting/dismounting mechanism is disposed et the location where the hole detection means should be located.

FIG. 1 shows in plan view an example of the conventional floppy disk assembly. A sliding plate 2 is slidably mounted on an assembly frame 1a. In FIG. 1, when the floppy disk 23 is pushed into a cassette holding plate (not shown), an abutment surface 24 of the floppy disk 23 directly pushes en abutting portion 26 of a lock member 7a. Other than those arrangements which relate to or associated with the floppy disk mounting/dismounting mechanism, the general configuration of the conventional floppy disk assembly shown in FIG. 1 is the same as or similar to that of the assembly according to the present invention. Thus, the explanation for such general configuration and operation, which will be made with reference to FIGS. 2 and 3, is omitted here.

Since the floppy disk mounting/dismounting mechanism is subjected to pressure when a press button mounted on a push-button fixing portion 29 is actuated by the operator for dismounting or releasing the floppy disk from the floppy disk assembly, it is desirable that the mounting/dismounting mechanism and the press button be disposed on the same straight line. Thus, for providing the hole detection means in a way to meet such a desire, it becomes necessary to have the mounting/dismounting mechanism disposed at a location symmetrically opposite with respect to the center line of the assembly, that is the opposite or the left hand side, and also to have the press button moved to the same opposite side.

However, where the mounting/dismounting mechanism and the press button are moved to the left hand side, the operator must manipulate the press button with his left hand, which is inconvenient as it is normally desirable for the operator to be able to press the press button with his right hand.

Further, in order to arrange that the hole detection means be positioned at the location where the mounting/dismounting means in the above explained conventional arrangement is located, it is necessary to move the mounting/dismounting mechanism to a location which is further inside from the front panel side of the assembly in actual use (i.e., upper portion in the drawings). However, if such a change is to be made in the conventional arrangement, the location is which the floppy disk is actually mounted end the location of the mounting/dismounting mechanism will be apart from each other, in which case the mounting/dismounting mechanism cannot perform a proper interlocking operation simultaneously with the insertion of the floppy disk.

SUMMARY OF THE INVENTION

It is an object of the present invention to provide floppy disk assembly in which a storage capacity discrimination means can be arranged et an ideal location for effective operation of the assembly.

It is another object of the present invention to provide a floppy disk assembly in which, due to the provision of an additional member (a rod member), there is no interference between the lock member for affecting the mounting/dismounting operation and the means for detecting the capacity discrimination hole in the floppy disk.

According to one aspect of the invention, there is provided floppy disk assembly adapted to accommodate a floppy disk having a discrimination hole for discriminating a storage capacity, the floppy disk assembly comprising:

- a detecting member which detects whether or not the discrimination hole is present;
- a cassette holding plate which holds the floppy disk;
- a sliding plate which has s projection and which is subjected to a spring action for causing the cassette holding plate to slide from a position at which the floppy disk is mounted/dismounted to a position et which writing/reading is performed by a magnetic head;
- a lock member which engages with the projection of the sliding plate and is allowed to rotate; and
- a rod member which abuts at its first end the floppy disk when mounted and As pivotably connected at its second end to the lock member.

It is preferable that a press button manipulated by an operator for releasing the floppy disk, the projection of the sliding plate, and a rotating axis of the lock member are all disposed on the same straight line.

BRIEF DESCRIPTION OF THE DRAWINGS

The above and other objects, features and advantages of the present invention will be apparent from the following description of a preferred embodiment of the invention explained with reference to the accompanying drawings, in which.

PREFERRED EMBODIMENT OF THE INVENTION

Now, a preferred embodiment of the present invention will be explained with reference to the accompanying drawings. It should be noted that, throughout the following explanation, similar reference symbols or numerals refer to the same or similar elements in all the figures of the drawings.

Figure 2:
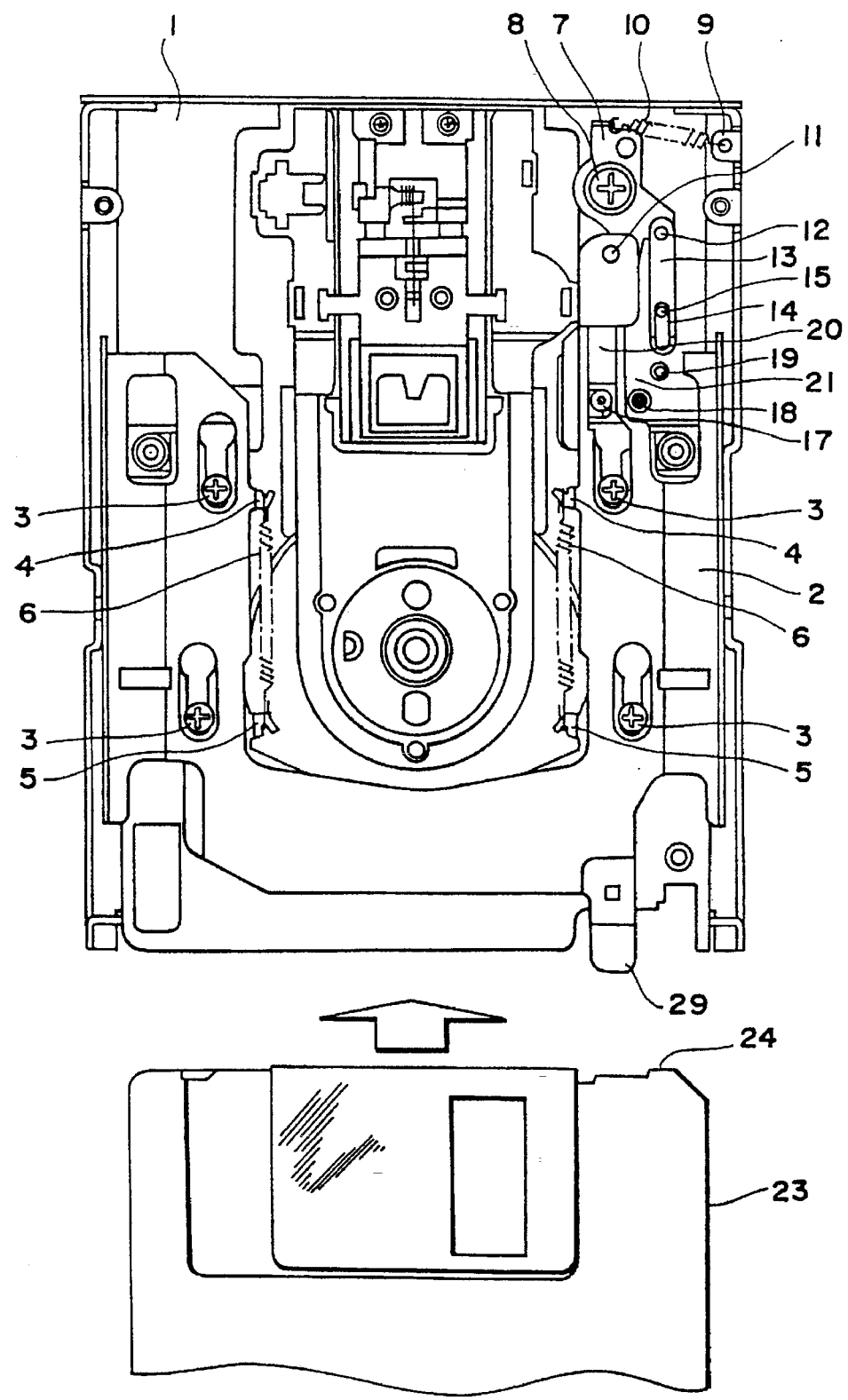
FIG. 2 is a plan view diagrammatically showing a floppy disk assembly of an embodiment according to the invention.

In FIG. 2, there is illustrated a floppy disk assembly of en embodiment according to the invention. A sliding plate 2 is slideably mounted on an assembly frame 1 by four setting screws 3. The sliding plate 2 and the assembly frame 1 are subjected to a spring force by springs 6 each being hooked at a projection 4 of the sliding plate 2 and at a projection 5 of the assembly frame 1. A lock member 7 is mounted on the assembly frame 1 by a screw which allows the lock member 7 to swing or rotate with the screw as the axis of rotation, and is subjected to a spring force by a spring 10 hooked between a projection of the lock member 7 end a hook member 9 of the assembly frame 1.

A claw member (not shown) of the lock member 7 engages, in its locked position as shown in FIG. 2, with a projection 11 provided on the sliding plate 2. A rod member 13 has at its one (first) end an elongated guide slot 14 which receives a guide pivot 15 fixed to the assembly frame 1 and at its the other (second) end a connecting pivot 12 by which the rod member 13 end the lock member 7 are pivotably connected. The rod member 13 is in the position as shown in FIG. 2 when the floppy disk is not mounted. A hole detection member 16 (shown in FIG. 5) is fixed to the assembly frame 1 from the back thereof by a screw 19 which engages a threaded hole 28 (shown in FIG. 5). The numerals 17 and 18 depict respectively tip portions of the hole detection member 16. Due to openings 20 and 21 provided in the sliding plate 2, there is no interference between the tip portions 17 and 18 of the hole detection member 16 and the sliding plate 18.

Figure 3:
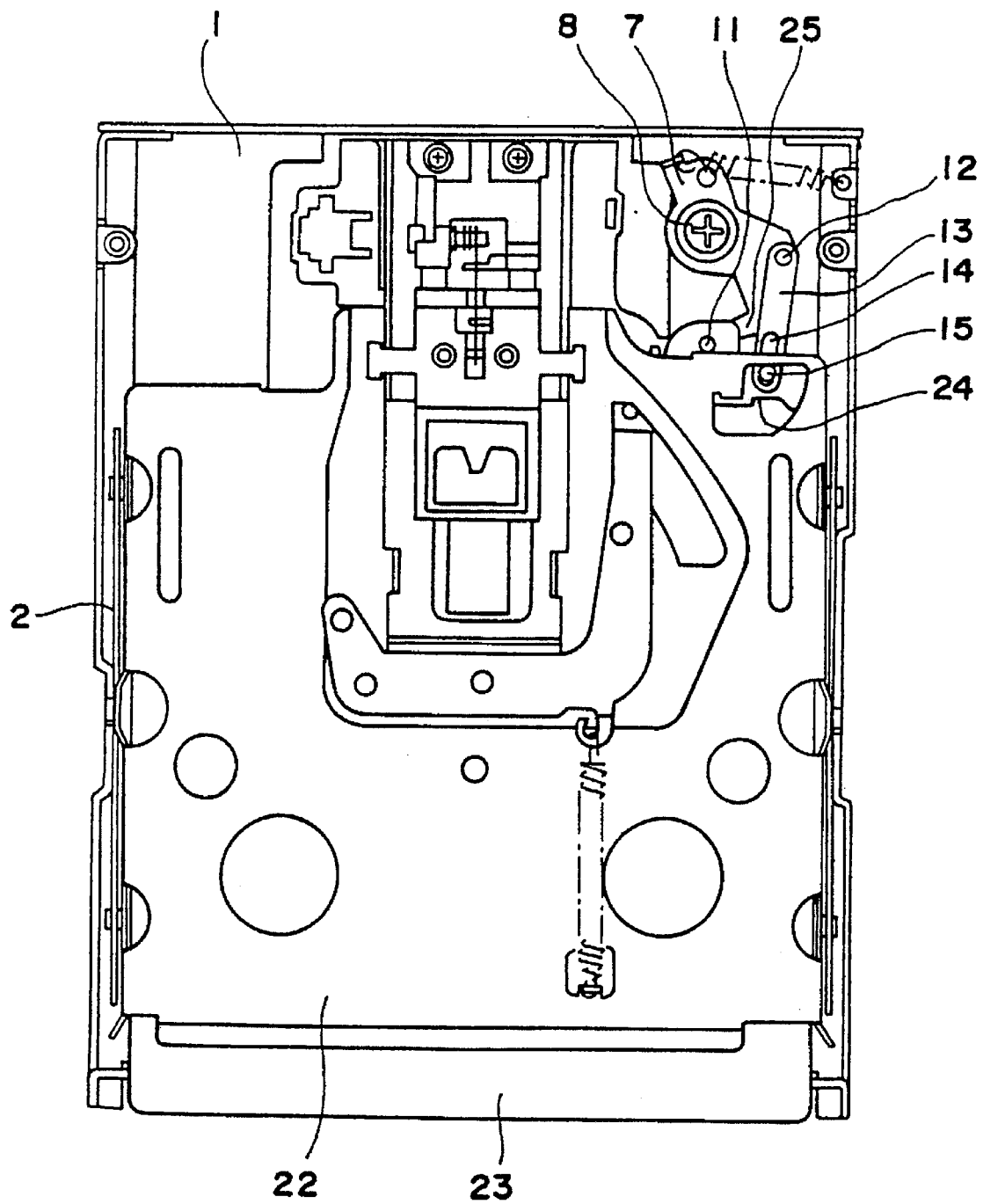
FIG. 3 is a plan view showing a state in which a cassette holding plate is mounted in the floppy disk assembly of FIG. 2 according to the invention.

FIG. 3 shows, in plan view of the assembly, a state in which a cassette holding plate 22 (not shown in FIG. 2) assembled to the sliding plate 2 and the floppy disk 23 is mounted to the assembly. In FIG. 3, as the insertion of the floppy disk 23 into the cassette holding plate 22 progresses, the abutting surface 24 which is a leading end of the floppy disk 23 abuts the first end of the rod member 13. Also, as the floppy disk is pushed in further towards the furthest point, the rod member 13 is pushed sideways due to the elongated guide slot 14 and the guide pivot 15. Since the second end of The rod member 13 is pivotably connected to the lock member 7 by the connecting pivot 12, the lock member 7 rotates with the screw 8 as the axis of rotation, whereby the locking between the claw member 25 of the lock member 7 end the projection 11 on the sliding plate 2 is released and the sliding plate 2 is caused to slide by the springs 6 (shown in FIG. 2) to complete the mounting of the floppy disk to the assembly.

Figure 1:
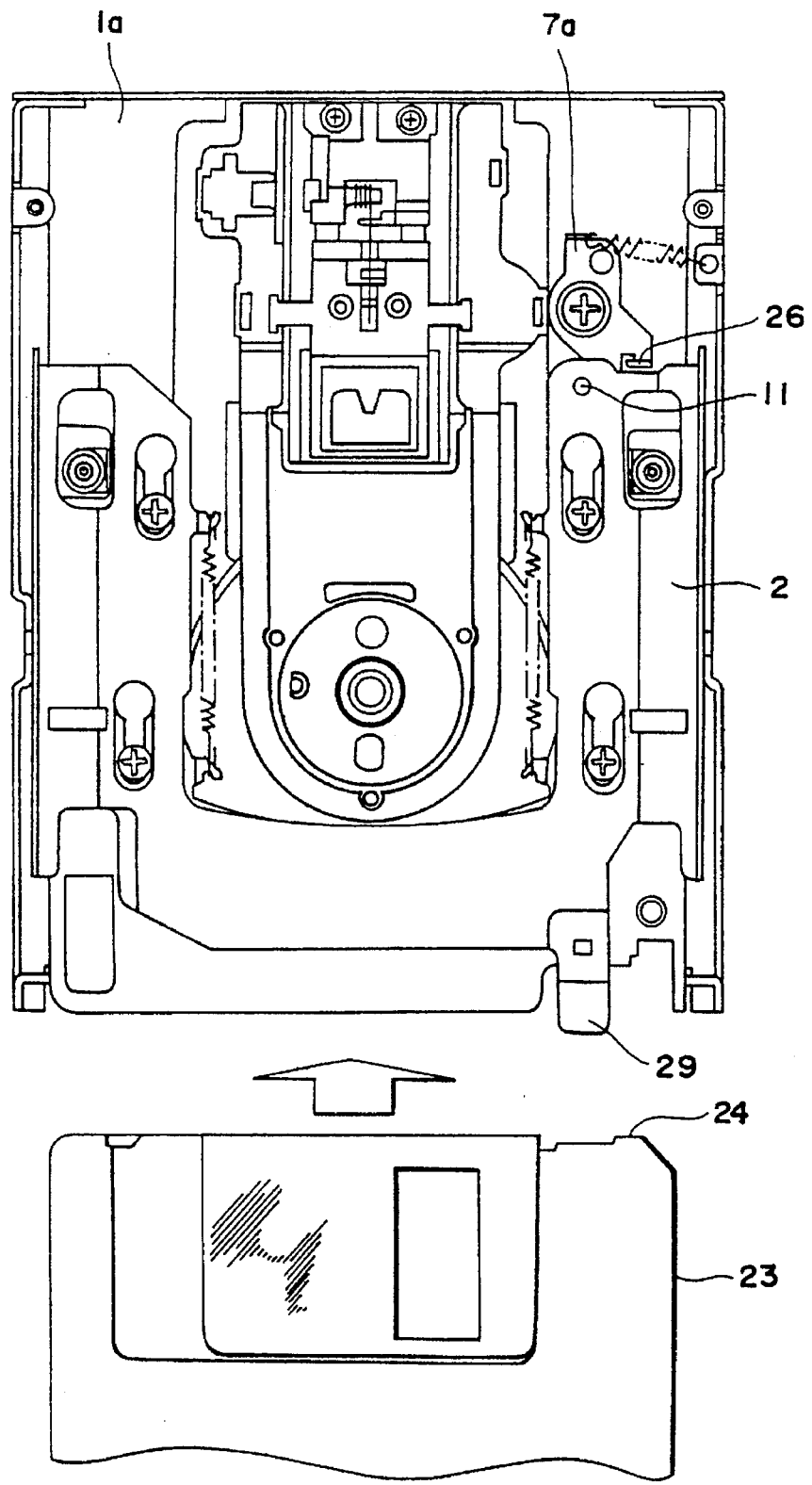
FIG. 1 is a plan view diagrammatically showing a conventional floppy disk assembly.
Figure 4:
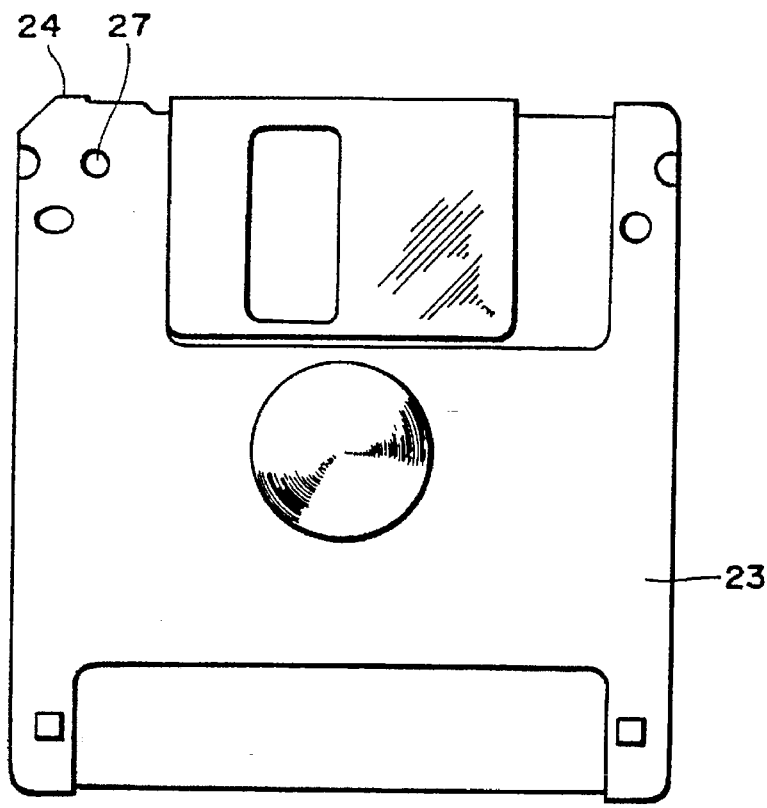
FIG. 4 is a plan view showing a back-side of a floppy disk used in the floppy disk assembly according to the invention.

FIG. 4 shows a floppy disk of the kind which is used with the floppy disk assembly described above. This floppy disk has a large storage capacity of, for example, over 10 mega-bytes, and is provided with a capacity discrimination hole 27 at the location shown in FIG. 4. It will be appreciated that, if the hole detection member as used in FIG. 2 is to be used in the conventional arrangement as shown in FIG. 1, the tip portions 17 end 18 of the hole detection member interfere with the lock member. The way to solve this problem, which is an object of this invention, is to provide the rod member 13 between the location of the hole detection member and the lock member 7 so as to move the location of the lock member 7 beyond the location of the hole detection member.

Figure 5:
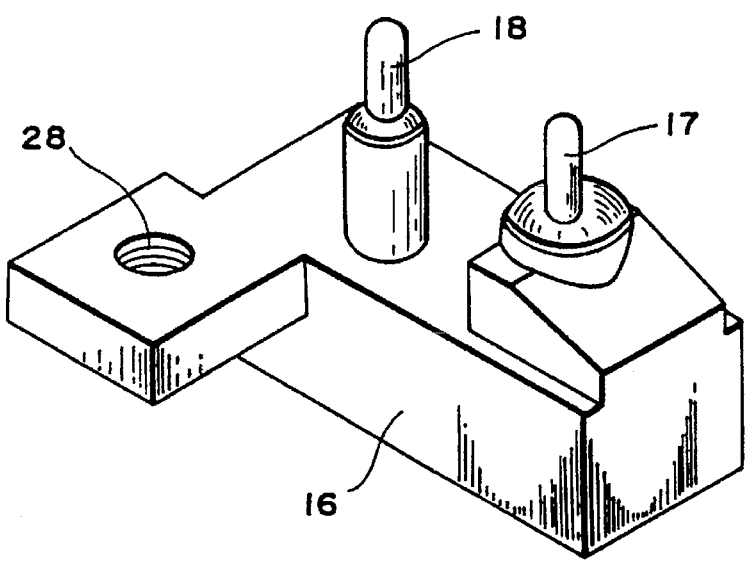
FIG. 5 is a perspective view of a portion of e means provided in the assembly to detect a storage capacity discrimination hole provided in the floppy disk.

FIG. 5 is a perspective view of the hole detection member 16. The hole detection member 16 detects the capacity discrimination hole by whether the tip portions 17 and 18 are being pressed or not. The hole detection member 16 is fixed to the assembly frame 1 from the back thereof with the screw 19 (shown in FIG. 2) being screwed into the threaded hole 28 (shown in FIG. 5). For dismounting the floppy disk from the assembly, a press button (not shown) provided at the press button fixing portion 29 at one end of the sliding plate 2 is pressed and, simultaneously as the floppy disk is released, the projection 11 on the sliding plate 2 engages with the claw member 25 of the lock member 7 whereby the sliding plate 2 is held in the position as shown in FIG. 2.

When the press button is pressed, the best position wherein the pressing force can be directed most efficiently onto the projection 11 is a position in which the press button (that is, the press button fixing portion 29) and the projection 11 are on the same straight line crossing therebetween. In this way, the sliding plate 2 will not be subjected to any turning or twisting force, so that no wearing develops between the sliding plate 1 end the four setting screws 3.

In the state shown in FIG. 2, the projection 11 is in engagement with the claw member 25 of the lock member 7. However, since the sliding plate 2 is under the spring action of the springs 6, the projection 11 causes the lock member 7 to be subjected to the spring force. The way to ensure that the projection 11 and the claw member 25 are not disengaged by the rotation of the lock member 7 due to the spring force is to have the projection 11 and the rotating axis of the lock member 7 disposed on the common straight line.

For the above reasons, the Center of the press button (that is, the press button fixing portion 29), the projection 11 provided on the sliding plate 2, end the rotating axis of the lock member 7 are all on the same straight line.

As explained above, according to the present invention, for arranging the floppy disk assembly to have detecting member for detecting the capacity discrimination hole provided on a floppy disk having a storage capacity over 10 MB, the position of the lock member is moved further beyond the location where the lock member existed in the prior art, the rod member which is movably associated with the lock member is provided to allow the lock member to be rotated as the floppy disk is inserted, and the position of the projection to engage with the claw member of the lock member on the sliding plate is also moved further beyond the location where the projection existed in the prior art. In this way, it is possible to provide the hole detection means at the ideal location with the minimum change from the prior art arrangement.

Also, according to the invention, since the floppy disk mounting/dismounting mechanism is arranged at the side where the press button is provided, all the elements on which the pressing force from the press button acts can be aligned on the common straight line and this ensures the reliable operation of the assembly. Furthermore, since the floppy disk mounting/dismounting mechanism is positioned at the same side as that of the hole detection means without requiring a change in the position from that in the prior art, the operator can manipulate the press button with his right hand as in the prior art.

While the invention has been described in its preferred embodiment, it is to be understood that the words which have been used are words of description rather than limitation and that changes within the purview of the appended claims may be made without departing from the true scope and spirit of the invention in its broader aspects.

What is claimed is:

1. A floppy disk assembly adapted to accommodate a floppy disk having two faces and an abutment surface end, a head window shutter, an abutment surface disposed on the abutment surface end and to one side of the head window shutter and a discrimination hole disposed near to the abutment surface end and on the same side of the head window shutter as the abutment surface, for discriminating a storage capacity, said floppy disk assembly comprising:

a cassette holding plate which holds said floppy disk;

a sliding plate which has a projection and which is subjected to a spring action for causing said cassette holding plate to slide from a position at which said floppy disk is mounted/dismounted to a position at which writing/reading is performed by a magnetic head;

a lock member which engages with said projection of said sliding plate and is allowed to rotate a guide pivot fixed to an assembly frame;

a rod member which abuts at its first end said abutment surface of said floppy disk when mounted and is pivotably connected at its second end to said lock member 1, wherein said rod member has, adjacent to said first end, an elongated guide slot, and said rod member has, adjacent to said second end, a connecting pivot by which said rod member and said lock member are connected, wherein when said abutment surface of said floppy disk abuts said first end of said rod member, said rod member moves guided by said guide pivot causing said lock member to rotate and to release said projection of said sliding plate; and a detecting member which detects whether or not said discrimination hole is present, said detecting member located opposite a first of the two faces of the floppy disk and said discrimination hole when said floppy disk is mounted, wherein said lock member is positioned beyond the location of said discrimination hole when said floppy disk is mounted, and on the same side of said head window shutter as said abutment surface, and on the same side of the floppy disk as said detecting member.

2. A floppy disk assembly according to claim 1, in which a press button for releasing said floppy disk, said projection of said sliding plate, and a rotating axis of said lock member are disposed on a common straight line.

3. A floppy disk assembly according to claim 1, in which said lock member has a claw member which disengages with said projection when said floppy disk is mounted and abuts said first end of said rod member.

4. A floppy disk assembly according to claim 1, wherein said detecting member is comprised of a plurality of tip portions, wherein said detecting member detects said discrimination hole based on depression of said plurality of tip portions.

* * * * *